(12) United States Patent
Miura

(10) Patent No.: US 7,791,456 B2
(45) Date of Patent: Sep. 7, 2010

(54) VIBRATOR

(75) Inventor: Naoki Miura, Fujiyoshida (JP)

(73) Assignee: Citizen Electronics Co., Ltd., Fujiyoshida-shi, Yamanashi-ken (JP)

( * ) Notice: Subject to any disclaimer, the term of this patent is extended or adjusted under 35 U.S.C. 154(b) by 609 days.

(21) Appl. No.: 11/710,287

(22) Filed: Feb. 23, 2007

(65) Prior Publication Data

US 2007/0194635 A1 Aug. 23, 2007

(30) Foreign Application Priority Data

Feb. 23, 2006 (JP) ............................. 2006-047317
Apr. 3, 2006 (JP) ............................. 2006-101559

(51) Int. Cl.
*H04B 3/36* (2006.01)

(52) U.S. Cl. .................................................. 340/407.1

(58) Field of Classification Search ............... 340/407.1
See application file for complete search history.

(56) References Cited

U.S. PATENT DOCUMENTS

| 5,861,686 | A | * | 1/1999 | Lee ............... 310/36 |
| 5,894,263 | A | | 4/1999 | Shimakawa et al. |
| 6,738,489 | B2 | * | 5/2004 | Chung et al. ............... 381/396 |
| 2003/0102739 | A1 | | 6/2003 | Yoneyama et al. |
| 2003/0174464 | A1 | * | 9/2003 | Funawatari et al. ......... 361/685 |
| 2004/0086147 | A1 | * | 5/2004 | Koura et al. ................. 381/412 |
| 2004/0119343 | A1 | | 6/2004 | Ueda et al. |
| 2004/0165744 | A1 | * | 8/2004 | Tsumori et al. ............. 381/345 |
| 2004/0169425 | A1 | | 9/2004 | Aihara |

FOREIGN PATENT DOCUMENTS

| EP | 1 145 770 A2 | 10/2001 |
| JP | 11-068903 A | 3/1999 |
| JP | 2006-333273 A | 12/2006 |
| JP | 2007-203227 (A) | 8/2007 |

OTHER PUBLICATIONS

GB Search Report dated May 15, 2007.
Japanese Patent Application JP 2006-26447, dated Feb. 2, 2006.

* cited by examiner

*Primary Examiner*—Daniel Wu
*Assistant Examiner*—Naomi Small
(74) *Attorney, Agent, or Firm*—Brinks Hofer Gilson & Lione

(57) ABSTRACT

A vibrator includes a voice coil and a vibrating member that vibrates along the axial direction of the voice coil when it is excited by application of an alternating current thereto. A suspension supports the vibrating member vibratably in the axial direction. A casing houses the voice coil, the vibrating member, and the suspension. A buffering member is provided so that the vibrating member strikes the buffering member when the vibration amplitude of the vibrating member has exceeded a predetermined value in a resonance region around the resonance point of the vibrating member.

11 Claims, 8 Drawing Sheets

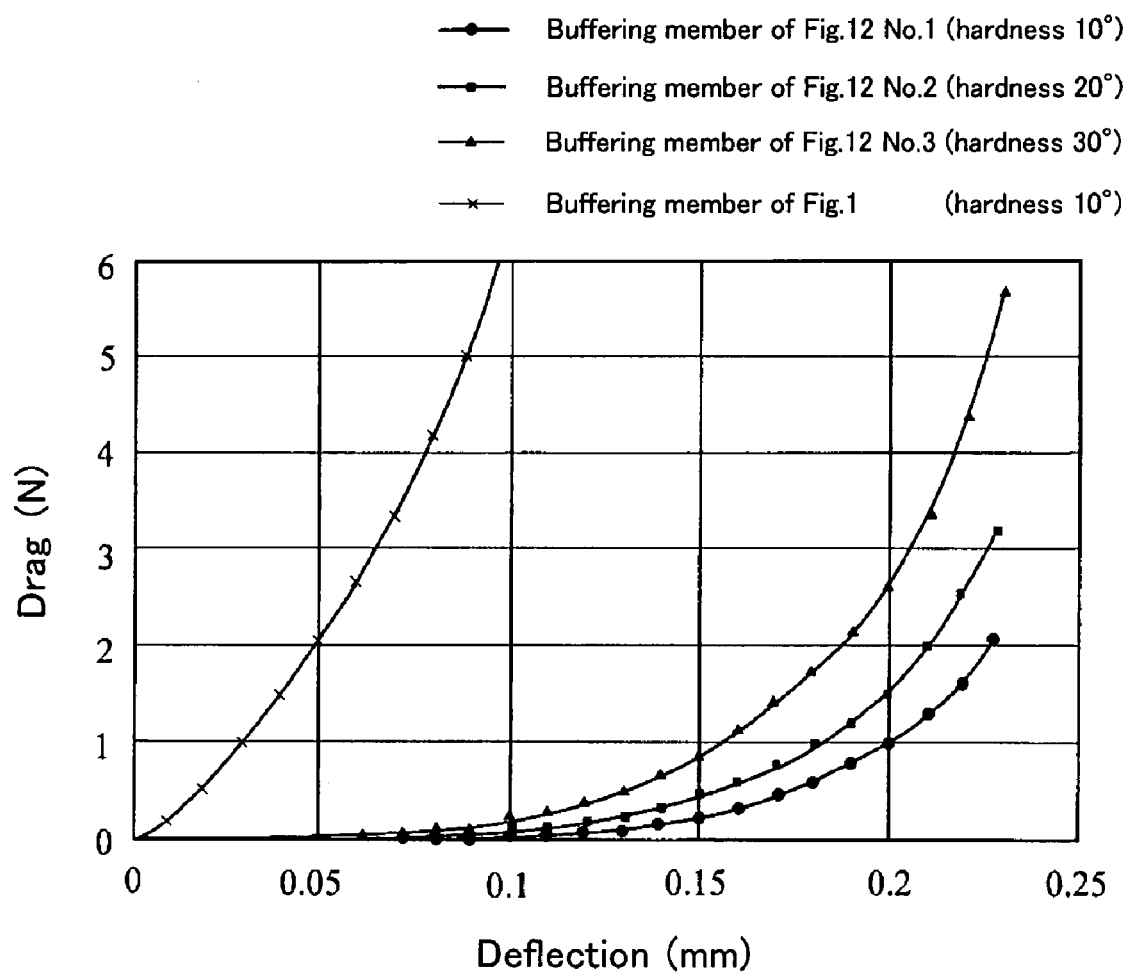

VIBRATOR

This application claims priority under 35 U.S.C. §119 to Japanese Patent Application Nos. JP2006-047317 filed Feb. 23, 2006, and JP2006-101559 filed Apr. 3, 2006, the entire content of which is hereby incorporated by reference.

BACKGROUND OF THE INVENTION

1. Field of the Invention

The present invention relates to a vibrator that may be incorporated in a small-sized device such as a mobile cellular phone, a watch and other portable devices. More particularly, the present invention relates to a vibrator for use in a cellular phone to indicate an incoming call to a user.

2. Description of the Related Arts

Conventionally, a portable terminal device such as a cellular phone has a vibrator incorporated therein as a device that indicate an incoming call to the user by vibrations of the cellular phone body, and there has been a demand for miniaturization of the vibrator. Under these circumstances, the present applicant proposed a compact vibrator as shown in FIG. 10 (see Japanese Patent Application No. 2006-026447).

The proposed vibrator includes a voice coil 10 and a vibrating member 20 that vibrates in the axial direction of the voice coil 10 in response to the application of an alternating current to the voice coil 10. First and second suspensions 3 and 5 are disposed facing each other across the vibrating member 20 to support it vibratably in the axial direction. The vibrator further has a casing that houses the voice coil 10, the vibrating member 20, and the suspensions 3 and 5. When the voice coil 10 is supplied with an alternating current, the vibrating member 20 is reciprocated in the vicinity of a resonance frequency determined by the weight of the vibrating member 20 and the spring constant of the pair of suspensions 3 and 5, thereby generating vibrations.

FIG. 11 is a graph showing the relationship between the frequency and acceleration of the above-described vibrator. In the conventional vibrator, an input signal of a predetermined frequency in a narrow resonance frequency region t is applied to the voice coil 10, thereby obtaining vibrations with a desired amplitude. The resonance frequency region is, however, determined by the weight of the vibrating member 20 and the spring constant of the suspensions 3 and 5, as stated above. Therefore, if there are variations in the weight of the vibrator constituent elements and the spring constant of the suspensions for each vibrator, the resonance frequency region shifts in accordance with the variations. Consequently, even if an input signal of a predetermined frequency is supplied to the voice coil, the frequency of the input signal may fail to fall within the resonance frequency region t of the vibrator. In such a case, the amplitude of vibrations reduces to a considerable extent. If such a vibrator is installed in a cellular phone, it may be impossible to obtain a sufficient vibration amplitude to surely indicate an incoming call to the user.

SUMMARY OF THE INVENTION

Accordingly, an object of the present invention is to provide a vibrator capable of surely transmitting vibrations of the vibrating member to the casing even if the frequency of the input signal deviates from the resonance point (resonance frequency) of the vibrating member.

The present invention provides a vibrator including a voice coil and a vibrating member that vibrates along the axial direction of the voice coil when it is excited by application of an alternating current thereto. A suspension supports the vibrating member vibratably in the axial direction. A casing houses the voice coil, the vibrating member, and the suspension. A buffering member is provided so that the vibrating member strikes the buffering member when the vibration amplitude of the vibrating member has exceeded a predetermined value in a resonance region around the resonance point of the vibrating member.

The term "resonance region" as used herein means a frequency region including the resonance point and the rising to and the falling from the resonance point. In this vibrator, even if the frequency of the alternating current applied to the voice coil deviates from the resonance point, or resonance frequency, of the vibrating member, variations of vibrators can be reduced by appropriately setting the buffering member.

The buffering member may be made from a foam material such as a microcellular polymer.

The arrangement may be as follows. The vibrating member and the buffering member have respective surfaces that strike each other when the vibration amplitude of the vibrating member has exceeded the above-described predetermined value, and at least one of the surfaces has a plurality of projections extending toward the other surfaces.

In this case, the buffering member is preferably made from silicone rubber.

The suspension may have a first and a second suspensions that support the vibrating member from both sides thereof in the axial direction.

Further, the vibrator may be arranged as follows. The casing includes a cup-shaped member having a tubular portion coaxial with respect to the voice coil, a bottom wall portion that closes one end of the tubular portion, and an opening at the other end of the tubular portion. The casing further includes a circular base plate that closes the opening of the cup-shaped member and that supports the voice coil. The base plate has wiring for supplying an input signal to the voice coil. The buffering member is mounted on the base plate so as to face the vibrating member inside the voice coil. The spacing a between the buffering member and the vibrating member in the axial direction and the spacing b in the axial direction between the vibrating member and the bottom wall of the casing satisfy the relationship of $b \geq 1.2 \times a$.

The above and other objects, features and advantages of the present invention will become more apparent from the following description of the preferred embodiments thereof, taken in conjunction with the accompanying drawings.

BRIEF DESCRIPTION OF THE DRAWINGS

FIG. 14 is a graph showing the results of a simulation analysis to examine the cushioning properties of the buffering member used in the vibrator according to the seventh embodiment and buffering members used in other embodiments.

DESCRIPTION OF THE PREFERRED EMBODIMENTS

Embodiments of the vibrator according to the present invention will be described below with reference to the accompanying drawings.

Figure 1A:
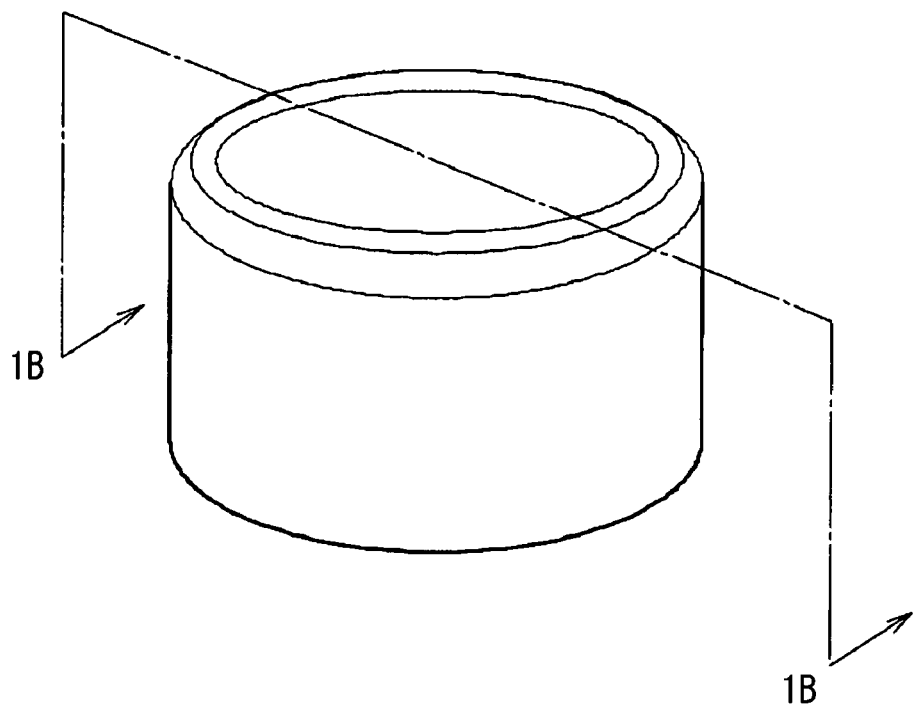
FIG. 1A is a perspective view of a vibrator according to a first embodiment of the present invention.
Figure 1B:
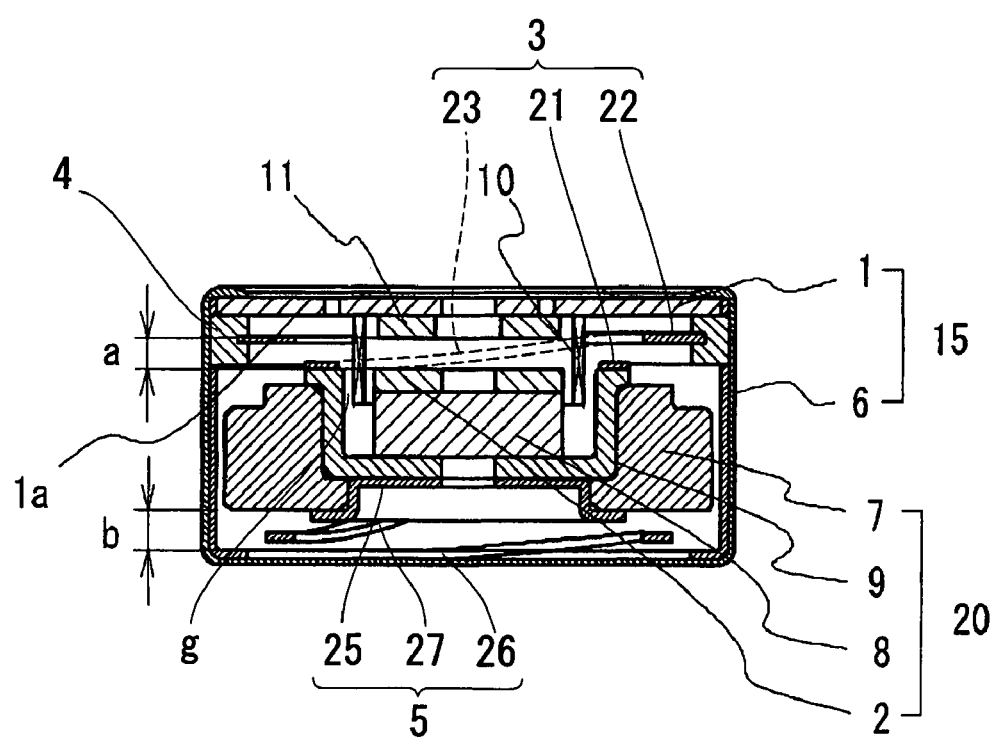
FIG. 1B is a sectional view taken along the line 1B-1B in FIG. 1A.

A vibrator according to a first embodiment of the present invention has, as shown in FIG. 1B, a cylindrical voice coil 10, a vibrating member 20, and a first and a second suspensions 3 and 5 that resiliently support the vibrating member 20. When the voice coil 10 is supplied with an alternating current, the vibrating member 20 is reciprocated in the axial direction of the voice coil 10, thereby generating vibrations. The voice coil 10, the vibrating member 20, and the first and the second suspensions 3 and 5 are housed in a casing 15. The casing 15 is formed from a cup-shaped member 6 that is coaxial with respect to the voice coil 10. The casing 15 further has a circular base plate 1 that closes the opening of the cup-shaped member 6 and that supports the voice coil 10. The base plate 1 has wiring for supplying an input signal to the voice coil 10. The vibrating member 20 has a cup-shaped yoke 9 placed coaxially with respect to the voice coil 10. A magnet 8 and a top plate 2 are successively stacked in the yoke 9 in coaxial relation thereto. The magnet 8 is secured to the bottom inner surface of the yoke 9. Further, an annular weight 7 is secured to the outer periphery of the yoke 9. The voice coil 10 is inserted into a magnetic gap g formed between the outer peripheral surface of the top plate 2 and the inner peripheral surface at the upper end of the yoke 9.

Figure 7A:
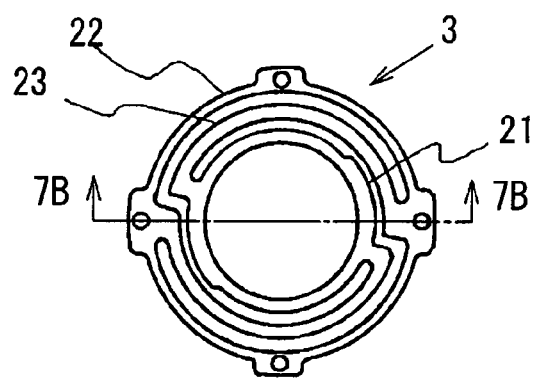
FIG. 7A is a plan view of a first suspension in an embodiment of the present invention.
Figure 7B:
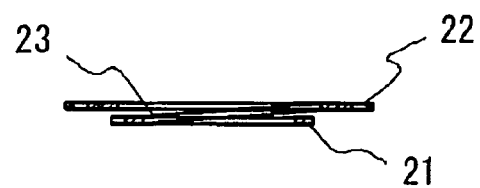
FIG. 7B is a sectional view taken along the line 7B-7B in FIG. 7A.
Figure 8A:
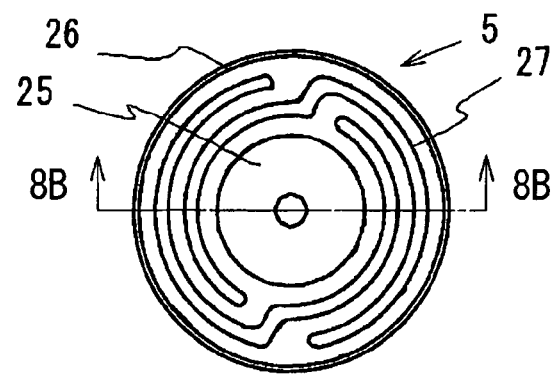
FIG. 8A is a plan view of a second suspension in an embodiment of the present invention.
Figure 8B:
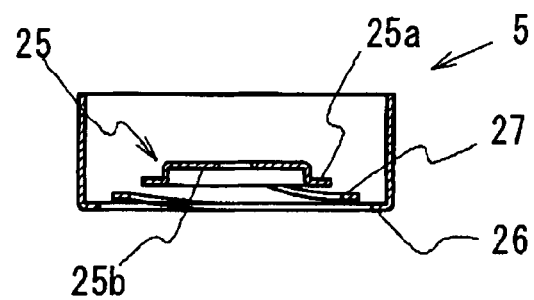
FIG. 8B is a sectional view taken along the line 8B-8B in FIG. 8A.

The first suspension 3 has, as shown in FIGS. 7A and 7B, a ring-shaped inner peripheral portion 21, a ring-shaped outer peripheral portion 22, and a pair of arcuate arm portions 23 provided in an annular space between the inner and outer peripheral portions 21 and 22. Each arm portion 23 is connected at one end thereof to the inner peripheral portion 21 and at the other end thereof to the outer peripheral portion 22. The inner peripheral portion 21 of the first suspension 3 is fixed to the upper end surface of the yoke 9. The outer peripheral portion 22 of the first suspension 3 is secured to a frame member 4 fixed to the inner peripheral surface of the casing 15. The second suspension 5 has, as shown in FIGS. 8A and 8B, a ring-shaped inner peripheral portion 25, a ring-shaped outer peripheral portion 26, and a pair of arcuate arm portions 27 provided in an annular space between the inner and outer peripheral portions 25 and 26. The inner peripheral portion 25 has a stepped portion 25a that is joined to the lower end surface of the yoke 9. The outer peripheral portion 26 is integrally formed with a tubular member that is engaged with the bottom wall of the cup-shaped member 6 and that is fitted in engagement with the inner peripheral surface of the cup-shaped member 6.

The base plate 1 has a buffering member 11 secured to the lower surface thereof (i.e. the surface facing the vibrating member 20) with an adhesive or pressure-sensitive adhesive tape, for example. The buffering member 11 is made from a microcellular polymer foam. The buffering member 11 is provided so that the vibrating member 20 strikes it when the vibration amplitude of the vibrating member 20 has increased to a predetermined amplitude on its way to the amplitude at the resonance point thereof. "Poron" (trade name), which is commercially available, is usable as a microcellular polymer foam for the buffering member 11. It is also possible to use foam materials such as polyurethane foam and polyethylene foam for the buffering member 11. Experimental results revealed, however, that the most favorable effects were obtained when "Poron" (trade name), which is commercially available, was used as a microcellular polymer foam.

Figure 2:
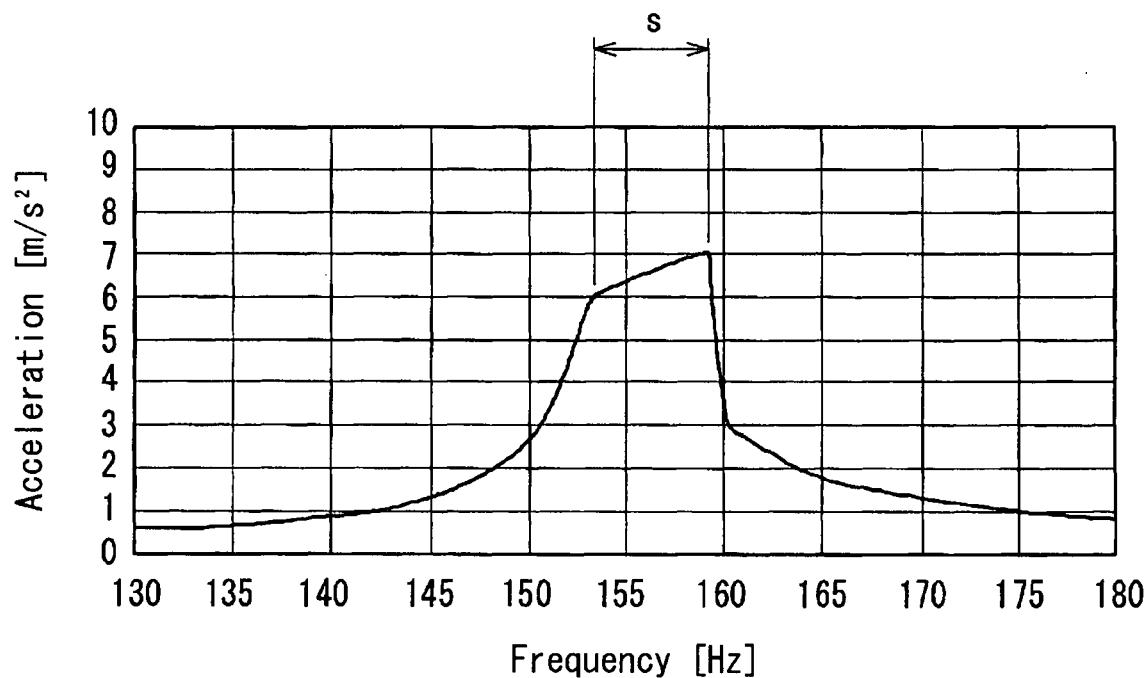
FIG. 2 is a graph showing the relationship between the frequency and acceleration of the vibrator according to the first embodiment of the present invention.

FIG. 2 is a graph showing the relationship between the frequency and acceleration of the vibrator according to this embodiment. It will be understood from FIG. 2 that in this vibrator the vibrating member 20 strikes the buffering member 11 in a frequency region (band) s, with the vibration amplitude of the vibrating member 20 being suppressed.

Conventionally, to obtain a desired vibration amplitude (acceleration) from a vibrator, the frequency of the input signal is set substantially the same as the natural frequency of the vibrating member of the vibrator thereby obtaining an amplitude in the vicinity of the resonance point of the vibrating member. In this case, however, if the resonance point of the vibrating member varies for each vibrator owing to variations in weight of the vibrator constituent elements, large variations occur in the obtained vibration amplitude (acceleration) of the vibrating member. To solve this problem, the buffering member is provided so that the vibrating member strikes it as stated above, whereby the amplitude (acceleration) to be obtained is made smaller than that obtained at the resonance point [like an amplitude (acceleration) obtained with an input frequency in a predetermined range s around the resonance point, as shown in FIG. 2]. If the desired vibration amplitude (acceleration) of the vibrating member of the vibrator is set small as described above, the casing can be surely vibrated as long as the frequency of the input signal falls within a range in which the desired amplitude is obtained. Consequently, it is possible to solve the above-described problem with the conventional vibrator.

Generation of noise can be prevented by setting the space b in FIG. 1B larger than the space a (e.g. $b \geqq 1.2a$) so that the vibrating member 20 cannot strike the bottom wall of the casing 15 even if the vibrating member 20 oscillates to a considerable extent due to an excessive input.

Figure 3:
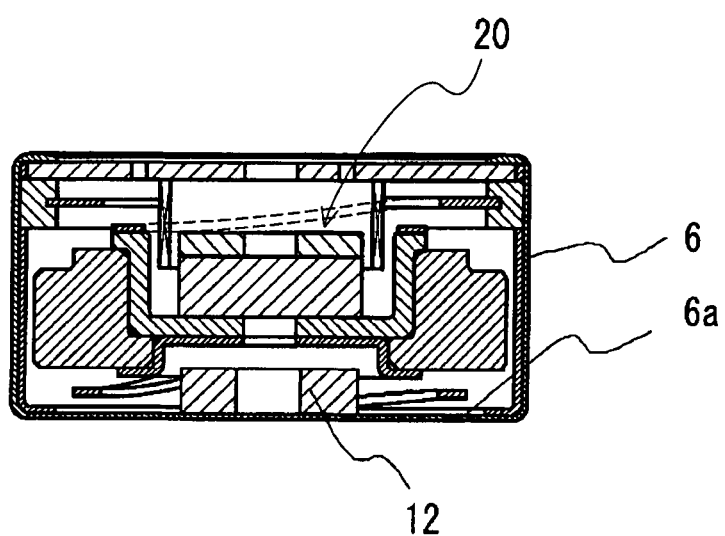
FIG. 3 is a sectional view of a vibrator according to a second embodiment of the present invention.

FIG. 3 shows a vibrator according to a second embodiment of the present invention. In this vibrator, as shown in the figure, a buffering member 12 formed from "Poron", which is a microcellular polymer foam, is provided on the upper surface (surface facing the vibrating member 20) 6a of the bottom wall of the cup-shaped member 6 of the casing 15.

Figure 4:
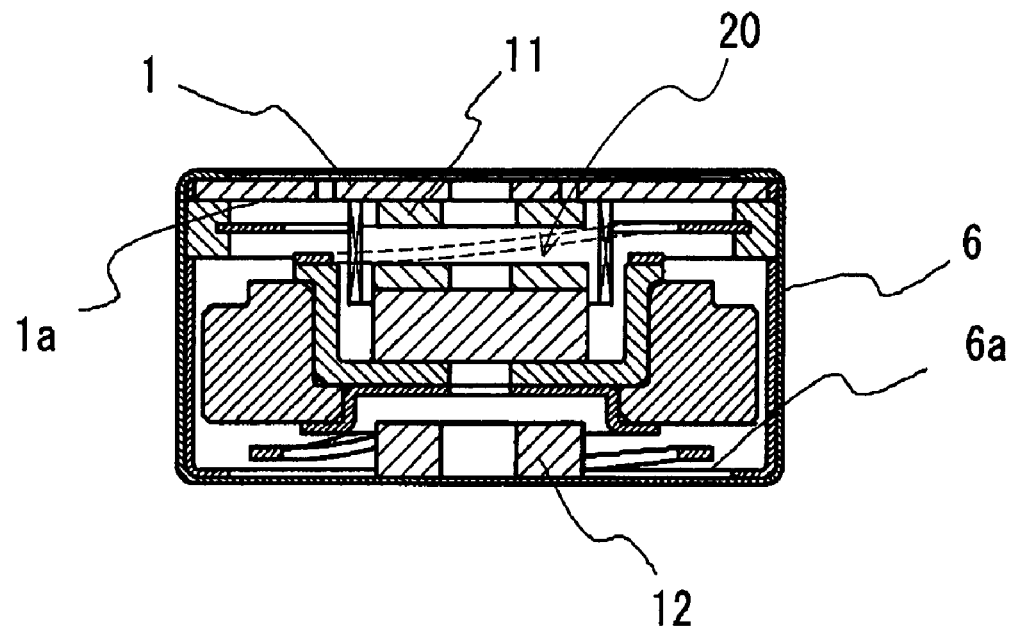
FIG. 4 is a sectional view of a vibrator according to a third embodiment of the present invention.

FIG. 4 shows a vibrator according to a third embodiment of the present invention. In this vibrator, as shown in the figure, a buffering member 11 made from "Poron", which is a microcellular polymer foam, is provided on the lower surface 1a of the base plate 1. In addition, a buffering member 12 made from "Poron", which is a microcellular polymer foam, is provided on the upper surface 6a of the bottom wall of the cup-shaped member 6. The vibrator of this embodiment offers the same advantageous effects as those obtained from the vibrator of the first embodiment. It should be noted, however, that the vibrator of the first embodiment is preferable because it needs to install a buffering member at only one place.

Figure 5:
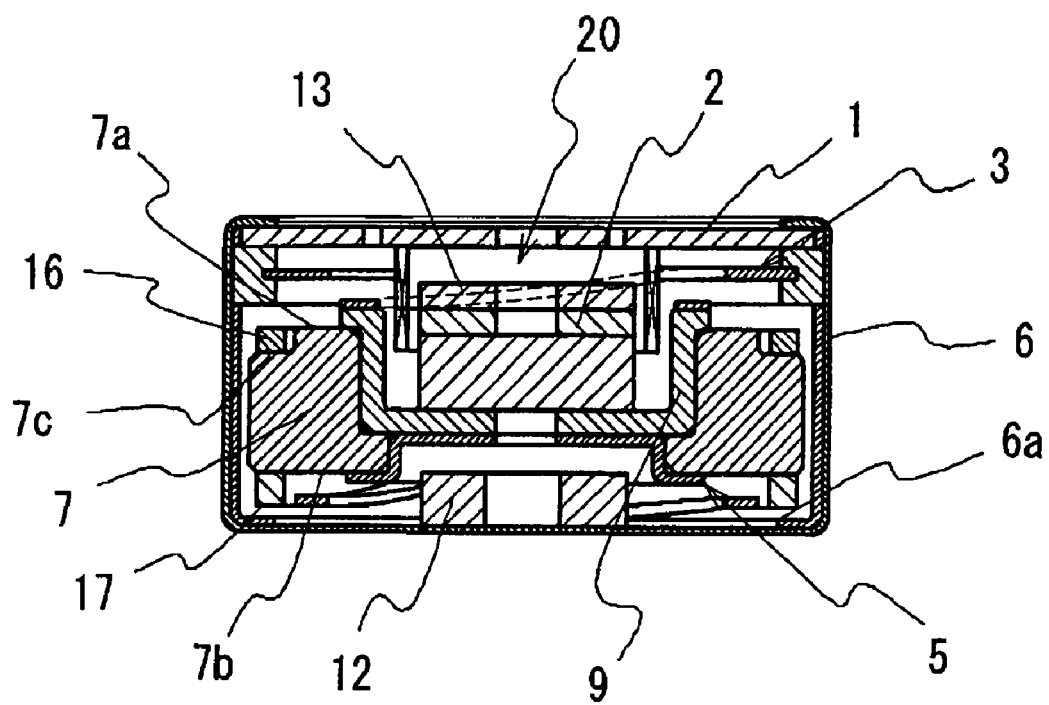
FIG. 5 is a sectional view of a vibrator according to a fourth embodiment of the present invention.

FIG. 5 shows a vibrator according to a fourth embodiment of the present invention. In this vibrator, as shown in the figure, a buffering member 13 made from "Poron", which is a microcellular polymer foam, is provided on the upper surface (surface facing the base plate 1) of the top plate 2, and a buffering member 12 made from "Poron" is provided on the bottom wall 6a of the cup-shaped member 6. In addition, ring-shaped buffering members 16 and 17 are provided on the weight 7, which is secured to the yoke 9. The upper surface of the buffering member 16 provided on the weight 7 is substantially flush with the upper surface 7a of the weight 7. The buffering member 17 is positioned on the lower surface 7b of the weight 7 so as to face the bottom wall of the casing 15. The buffering member 17 has an inner diameter with which it will not interfere with the second suspension 5.

Figure 6:
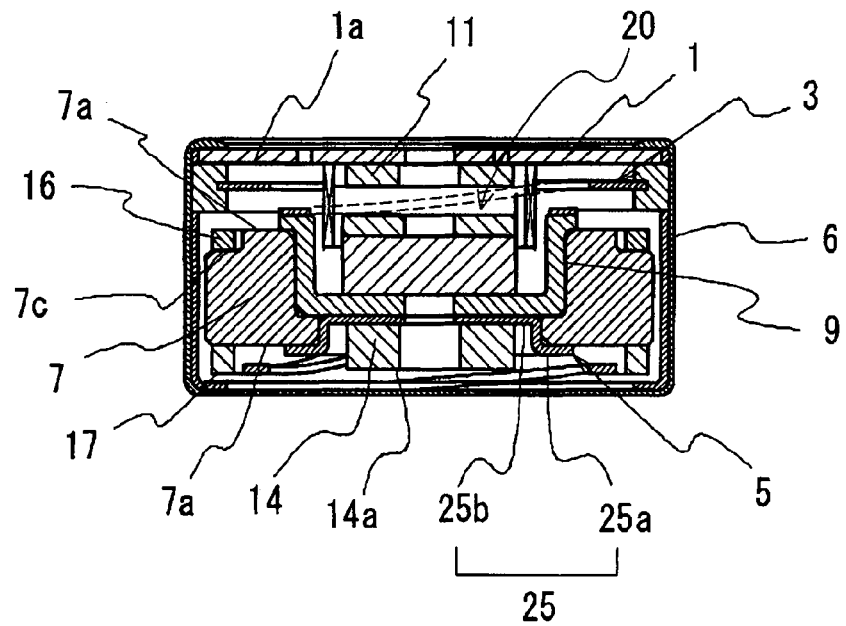
FIG. 6 is a sectional view of a vibrator according to a fifth embodiment of the present invention.

FIG. 6 shows a vibrator according to a fifth embodiment of the present invention. In this vibrator, as shown in the figure, a buffering member 14 made from a microcellular polymer foam is provided on the second suspension 5, and a buffering member 11 is provided on the lower surface 1a of the base plate 1. In addition, buffering members 16 and 17 are provided on the weight 7, which is secured to the yoke 9. The buffering members 14, 11, 16 and 17 may be made from "Poron".

The buffering member 14 provided on the second suspension 5 is secured to the lower surface of the inner peripheral portion 25 of the second suspension 5. The buffering member 14 extends downward beyond the stepped portion 25a of the second suspension 5.

Figure 9:
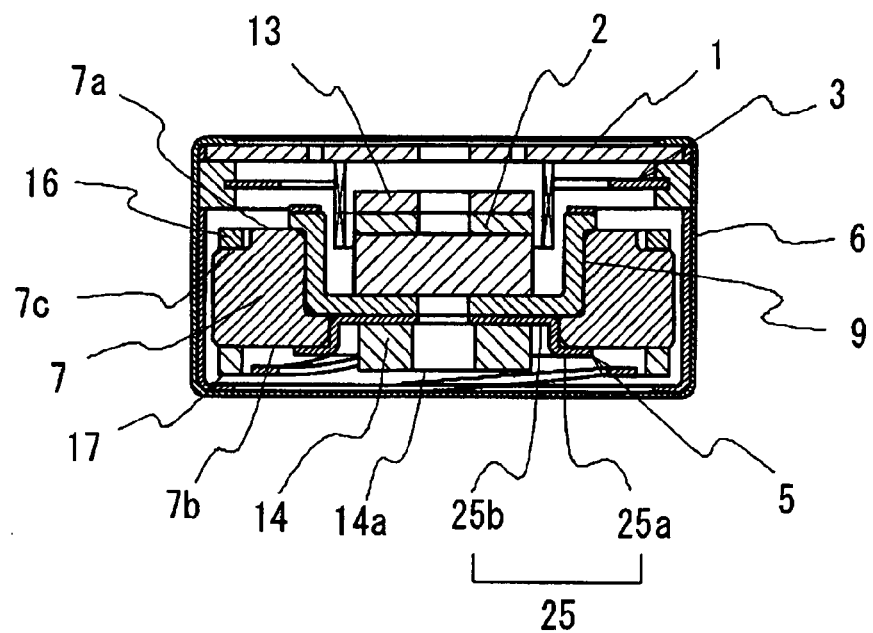
FIG. 9 is a sectional view of a vibrator according to a sixth embodiment of the present invention.
Figure 10:
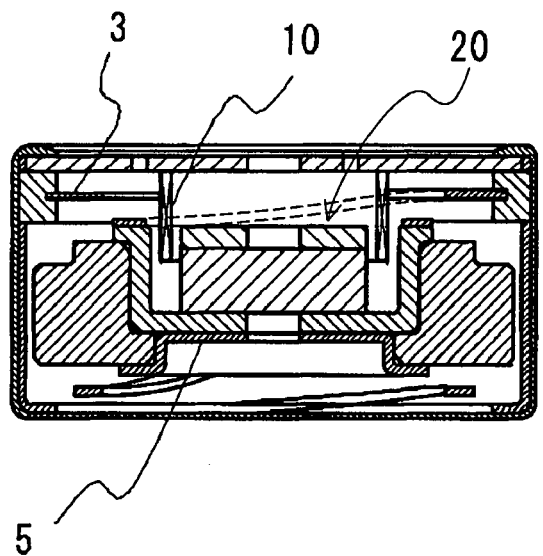
FIG. 10 is a sectional view of a vibrator according to a related art.
Figure 11:
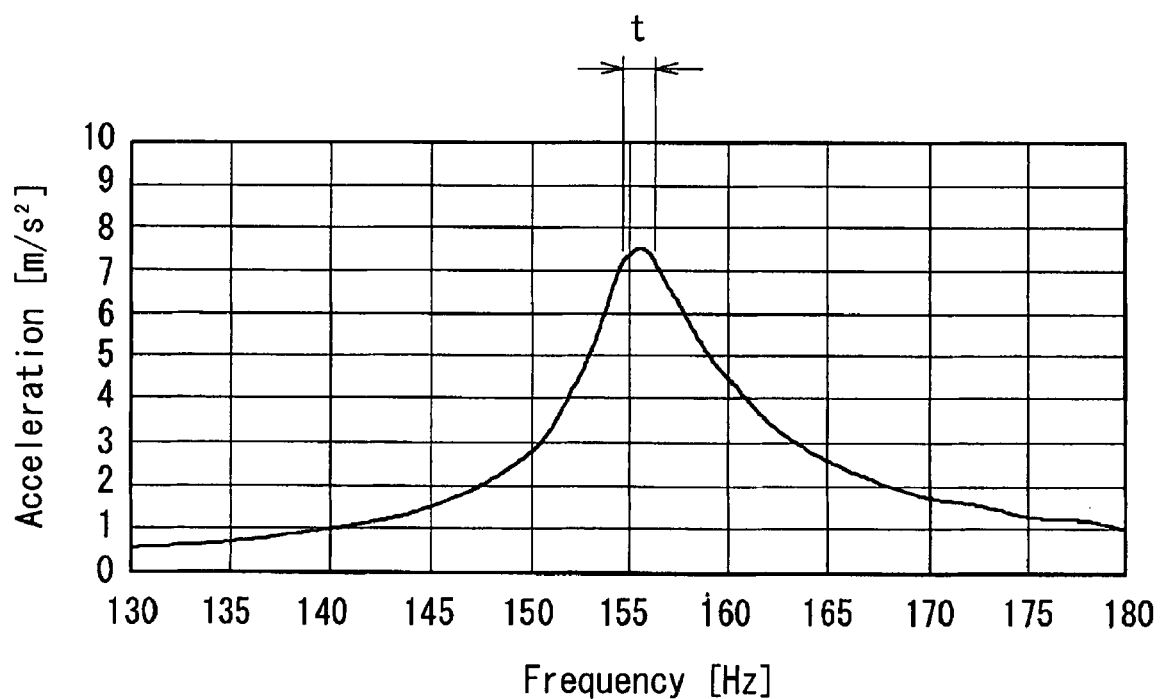
FIG. 11 is a graph showing the relationship between the frequency and acceleration of the vibrator according to the related art.

FIG. 9 shows a vibrator according to a sixth embodiment of the present invention. In this vibrator, as shown in the figure, a buffering member 13 is provided on the top plate 2, and a buffering member 14 is provided on the lower end surface of the yoke 9. In addition, buffering members 16 and 17 are provided on the weight 7.

In the vibrators according to the foregoing embodiments, the vibrating member is arranged to strike the casing through the buffering member at frequencies in a wide frequency region including the resonance point of the vibrating member. Therefore, even if the resonance point (i.e. natural frequency) of the vibrating member varies for each vibrator due to variations in weight of the vibrator constituent elements, the casing can be surely vibrated as long as the frequency of the input signal to the coil falls within the above-described wide frequency region.

Figure 12:
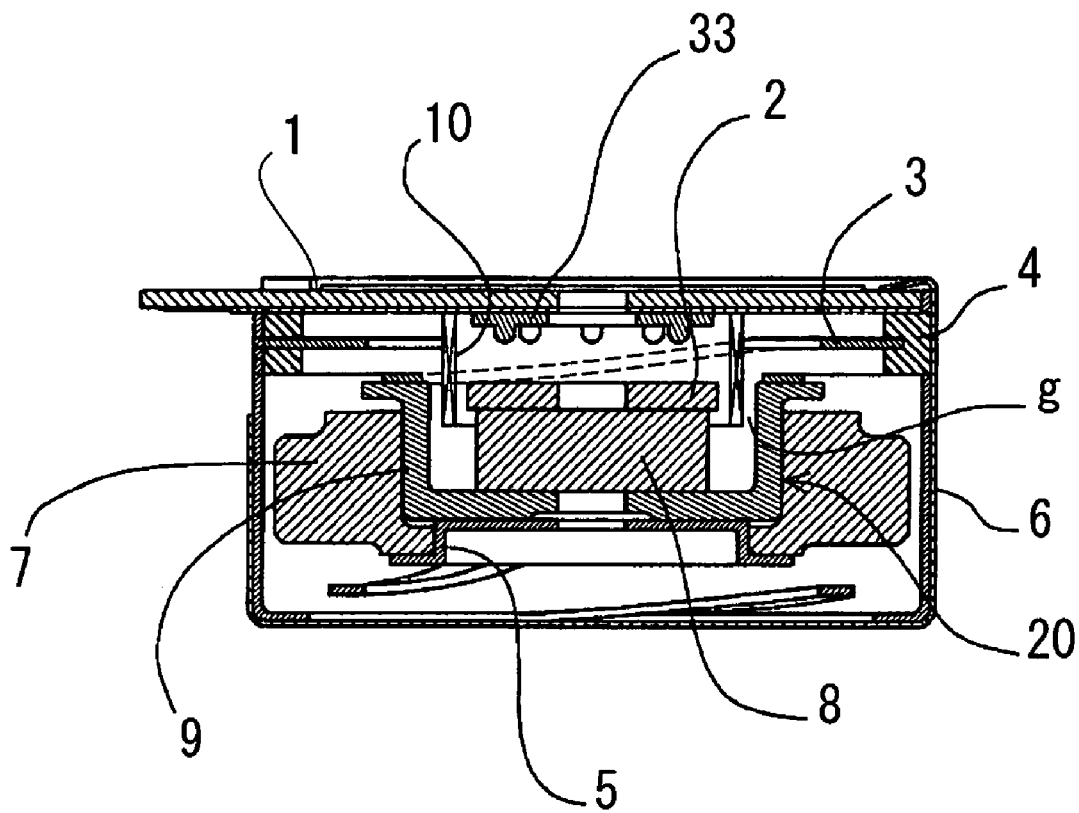
FIG. 12 is a sectional view of a vibrator according to a seventh embodiment of the present invention.

The vibrators according to the foregoing embodiments use a microcellular polymer as a material of the buffering members 11 to 14, by way of example. This material is, however, unsuitable for surface mount processing carried out at high temperature because of its relatively low heat resistance. FIG. 12 shows a vibrator according to a seventh embodiment of the present invention, which has a buffering member improved in heat resistance in the view mentioned above.

Figure 13:
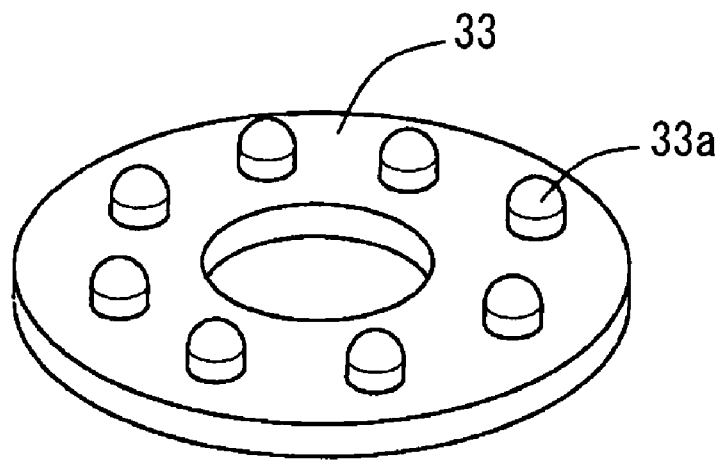
FIG. 13 is a perspective view of a buffering member used in the vibrator according to the seventh embodiment.

The vibrator of the seventh embodiment has the same basic structure as that of the first embodiment shown in FIGS. 1A and 1B. The seventh embodiment differs from the first embodiment as follows. The buffering member 11 provided on the base plate 1 is made from silicone rubber, which is more heat-resistant than microcellular polymer. Further, as shown in FIG. 13, the buffering member 33 is formed into an annular shape as a whole, and a plurality of circular columnar projections 33a, each having a hemispherical distal end, are formed on one side of the annular buffering member 33. The number of the projections 33a and the size of the outer diameter thereof are determined according to the required buffering capacity. FIG. 14 shows the results of a simulation analysis (FEM analysis) to examine flexibility of two different types of buffering members when the top plate 2 of the vibrating member 20 strikes these buffering members by vibration. One of the two types of buffering members was formed into a merely annular member from a microcellular polymer as in the case of the vibrator shown in FIG. 1. The other type of buffering member was made from silicone rubber as shown in FIG. 13 (the number of projections 33a: 8; the size of the outer diameter: 0.3 mm). It will be understood from FIG. 14 that the buffering member having a configuration as in the seventh embodiment (i.e. the configuration as shown in FIG. 13) exhibits fairly high flexibility, or cushioning properties, as compared with the buffering member having a merely annular shape as in the other embodiments.

It should be noted that the present invention is not necessarily limited to the foregoing embodiments but can be modified in a variety of ways without departing from the gist of the present invention.

What is claimed is:

1. A vibrator comprising:
a voice coil;
a vibrating member that vibrates along an axial direction of the voice coil when the voice coil is excited by application of an alternating current to the voice coil, the vibrating member comprising a cup shaped yoke and a magnet disposed in the yoke, and a top plate securely stacked on the magnet;
a suspension that supports the vibrating member vibratably in the axial direction, the suspension having a first suspension and a second suspension that support the vibrating member from an upper side and a lower side of the vibrating member, the first suspension comprising an inner peripheral portion that is fixed to an upper end surface of the yoke and an outer peripheral portion and the second suspension comprising an inner peripheral portion that is joined to a lower end surface of the yoke and an outer peripheral portion that is integrally formed with a tubular member;
a casing that houses the voice coil, the vibrating member and the suspension with the outer peripheral portion of the first suspension fixed to the casing and the outer peripheral portion of the second suspension engaged with the casing; and
a buffering member provided to face the vibrating member so that the vibrating member strikes the buffering member when a vibration amplitude of the vibrating member has exceeded a predetermined value in a resonance region around resonance point of the vibrating member, the buffering member being fixed to the vibrating member.

2. The vibrator according to claim 1, wherein the buffering member is made from silicone rubber.

3. The vibrator according to claim 1, wherein the buffering member is made from a foam material.

4. The vibrator according to claim 3, wherein the buffering member is made from a microcellular polymer.

5. The vibrator according to claim 1, wherein the casing comprises:
a cup-shaped member having a tubular portion coaxial with respect to the voice coil, a bottom wall portion that closes one end of the tubular portion, and an opening at the other end of the tubular portion; and a circular base plate that closes the opening of the cup-shaped member and that supports the voice coil, the base plate having wiring for supplying an input signal to the voice coil.

6. The vibrator according to claim 1, wherein the vibrator member further comprises:

an annular weight secured to an outer periphery of the yoke, the voice coil being inserted into a magnetic gap formed between an outer peripheral surface of the top plate and an inner peripheral surface of the yoke at an upper end of the yoke.

7. The vibrator according to claim 1, wherein the buffering member is fixed to the top plate of the vibrating member.

8. The vibrator according to claim 1, wherein the buffering member is fixed to the lower end surface of the yoke.

9. The vibrator according to claim 6 wherein the buffering member is fixed to the annular weight.

10. The vibrator according to claim 1, further comprising another buffering member provided on the second suspension under the lower end surface of the yoke.

11. A vibrator comprising:

a voice coil;

a vibrating member that vibrates along an axial direction of the voice coil when the voice coil is excited by application of an alternating current to the voice coil, the vibrating member comprising a cup shaped yoke and a magnet disposed in the yoke, and a top plate securely stacked on the magnet;

a suspension that supports the vibrating member vibratably in the axial direction, the suspension having a first suspension and a second suspension that support the vibrating member from an upper side and a lower side of the vibrating member, the first suspension comprising an inner peripheral portion that is fixed to an upper end surface of the yoke and an outer peripheral portion and the second suspension comprising an inner peripheral portion that is joined to a lower end surface of the yoke and an outer peripheral portion that is integrally formed with a tubular member;

a casing that houses the voice coil, the vibrating member and the suspension with the outer peripheral portion of the first suspension fixed to the casing and the outer peripheral portion of the second suspension engaged with the casing; and a buffering member provided to face the vibrating member so that the vibrating member strikes the buffering member when a vibration amplitude of the vibrating member has exceeded a predetermined value in a resonance region around resonance point of the vibrating member, the buffering member being fixed to the second suspension.

* * * * *